United States Patent
Nam et al.

(10) Patent No.: US 8,986,999 B2
(45) Date of Patent: Mar. 24, 2015

(54) VIRUS/NANOWIRE ENCAPSULATION WITHIN POLYMER MICROGELS FOR 2D AND 3D DEVICES FOR ENERGY AND ELECTRONICS

(71) Applicants: Massachusetts Institute of Technology, Cambridge, MA (US); President and Fellows of Harvard College, Cambridge, MA (US)

(72) Inventors: Yoon Sung Nam, Cambridge, MA (US); Angela Belcher, Lexington, MA (US); Andrew Parsons Magyar, Cambridge, MA (US); Daeyeon Lee, Somerville, MA (US); Jin-Woong Kim, Yongin-si (KR); David Weitz, Bolton, MA (US)

(73) Assignees: Massachusetts Institute of Technology, Cambridge, MA (US); President and Fellows of Harvard University, Cambridge, MA (US)

( * ) Notice: Subject to any disclaimer, the term of this patent is extended or adjusted under 35 U.S.C. 154(b) by 0 days.

(21) Appl. No.: 14/175,397

(22) Filed: Feb. 7, 2014

(65) Prior Publication Data
US 2014/0151912 A1    Jun. 5, 2014

Related U.S. Application Data

(62) Division of application No. 12/678,894, filed as application No. PCT/US2008/077137 on Sep. 19, 2008, now Pat. No. 8,685,323.

(60) Provisional application No. 60/973,493, filed on Sep. 19, 2007.

(51) Int. Cl.
*G01N 15/06* (2006.01)
*G01N 33/00* (2006.01)
(Continued)

(52) U.S. Cl.
CPC .......... *B01J 13/0065* (2013.01); *B01F 13/0062* (2013.01); *B01J 13/14* (2013.01);
(Continued)

(58) Field of Classification Search
CPC ........ G01N 15/06; G01N 33/00; G01N 33/48
USPC ......... 977/700, 727, 762, 773, 802, 882, 902, 977/915, 962; 422/50, 68.1; 436/43, 63
See application file for complete search history.

(56) References Cited

U.S. PATENT DOCUMENTS 6,022,748 A * 2/2000 Charych et al. ............... 436/527
6,099,894 A    8/2000 Holman
(Continued)

FOREIGN PATENT DOCUMENTS

JP    2006-512102 A    4/2006
WO    WO 03/087335 A2    10/2003
WO    WO 2005/063897 A2    7/2005

OTHER PUBLICATIONS

Kim et al., "Fabrication of Monodisperse Gel Shells and Functional Microgels in Microfluidic Devices," Angewandte Chemie Int. Ed., 2007, 46:1819-1822.
(Continued)

*Primary Examiner* — Brian J Sines
(74) *Attorney, Agent, or Firm* — Foley & Lardner LLP

(57) ABSTRACT

Methods and apparatuses for encapsulating inorganic micro- or nanostructures within polymeric microgels are described. In various embodiments, viruses are encapsulated with microgels during microgel formation. The viruses can provide a template for in situ synthesis of the inorganic structures within the microgel. The inorganic structures can be distributed substantially homogeneously throughout the microgel, or can be distributed non-uniformly within the microgel. The inventive microgel compositions can be used for a variety of applications including electronic devices, biotechnological devices, fuel cells, display devices and optical devices.

3 Claims, 6 Drawing Sheets

(51) Int. Cl.
*G01N 33/48* (2006.01)
*B01J 13/00* (2006.01)
*B01J 13/14* (2006.01)
*B82B 3/00* (2006.01)
*B82Y 30/00* (2011.01)
*B82Y 40/00* (2011.01)
*B01F 13/00* (2006.01)

(52) U.S. Cl.
CPC .................. *B82B 3/00* (2013.01); *B82Y 30/00* (2013.01); *B82Y 40/00* (2013.01); *Y10S 977/70* (2013.01); *Y10S 977/762* (2013.01); *Y10S 977/902* (2013.01); *Y10S 977/915* (2013.01); *Y10S 977/962* (2013.01); *Y10S 977/882* (2013.01)
USPC ............. 436/63; 977/700; 977/762; 977/902; 977/915; 977/962; 977/882; 422/50; 422/68.1; 436/43

(56) References Cited

U.S. PATENT DOCUMENTS 6,544,800 B2 * 4/2003 Asher ........................... 436/531
2006/0174385 A1 8/2006 Gruber et al.
2008/0010707 A1 1/2008 Zhang et al.

OTHER PUBLICATIONS

Lee et al., "Ordering of quantum dots using genetically engineered viruses," Science, 2002, 296(5569):892-895.
Mao et al., "Viral assembly of oriented quantum dot nanowires," Proc. Natl. Acad. Sci USA, 2003, 100(12):6946-6951.
Nam et al., "Virus enabled synthesis and assembly of nanowires for lithium ion battery electrodes," Science, 2006, 312(5775):885-888.
Utada et al., "Dripping, Jetting, Drops and Wetting: The Magic of Microfluidics," MRS Bulletin, 2007, 32:702-708.

* cited by examiner

US 8,986,999 B2

VIRUS/NANOWIRE ENCAPSULATION WITHIN POLYMER MICROGELS FOR 2D AND 3D DEVICES FOR ENERGY AND ELECTRONICS

CLAIM OF PRIORITY

This divisional application claims priority to U.S. application Ser. No. 12/678,894, filed on Mar. 18, 2010, which claims priority to International Application No. PCT/US2008/077137, filed on Sep. 19, 2008, which claims priority to U.S. Provisional Application Ser. No. 60/973,493, filed Sep. 19, 2007, each of which is incorporated by reference in its entirety.

FIELD OF THE INVENTION

The invention relates to apparatus and methods for forming micro- and nanostructures within microgels. In particular, the invention relates to encapsulation of viruses within microgels wherein the viruses provide a template for the synthesis of inorganic structures within microgels.

BACKGROUND

In nature, organisms can build complex inorganic micro- and nanostructures by a process termed "biomineralization." Natural biological systems have evolved diverse structures, e.g., bones, teeth, mollusk shells and magnetosomes, which exhibit greatly increased structural integrity compared to the organic scaffold from which they are formed. Nature's design principles are very useful as they can provide new insights that allows engineers to create new inorganic nanomaterials via environmentally benign routes.

The ability of certain biomolecules to direct the growth and organization of inorganic solids has been noticed in naturally-occurring biomineralization systems. (E. Baeuerlein, *Biomineralization: From Biology to Biotechnology and Medical Application*, Wiley-VCH, Weinheim, New York, 2000, S. Mann, *Biomineralization: Principles and Concepts in Bioinorganic Materials Chemistry*, Oxford chemistry masters, 5, Oxford University Press, Oxford, New York, 2001.) It has also been demonstrated that certain viruses can serve as a template for the synthesis of inorganic nanostructures by identifying and engineering peptide aptamers expressed on the surface of viruses. (S. W. Lee, C. Mao, C. E. Flynn, and A. M. Belcher, "Ordering of quantum dots using genetically engineered viruses," *Science*, Vol. 296, No. 5569 (2002) pp. 892-895; C. Mao, C. E. Flynn, A. Hayhurst, R. Sweeney, J. Qi, G. Georgiou, B. Iverson, and A. M. Belcher, "Viral assembly of oriented quantum dot nanowires," *Proc Natl Acad Sci USA*, Vol. 100, No. 12 (2003) pp. 6946-6951.) It has also been found that two-dimensional self-assembly of viruses can be utilized to prepare unique viral thin-films that are useful in building battery electrodes via biomineralization. (K. T. Nam, D. W. Kim, P. J. Yoo, C.-Y. Chiang, N. Meethong, P. T. Hammond, Y.-M. Chiang, A. M. Belcher, "Virus enabled synthesis and assembly of nanowires for lithium ion battery electrodes," *Science*, Vol. 312, No. 5775 (2006) pp. 885-888.) These relatively new technologies offer potential for further development of advanced biotechnological devices useful in the fields of renewable energy, medical technologies, electronics, optical systems, and materials.

SUMMARY

In various embodiments, methods and apparatuses are described which can form in situ two-dimensional or three dimensional inorganic structures within a microgel encapsulation. In various aspects the inorganic structures can be micro- or nanostructures or nanotubes. In certain embodiments, the inorganic structures are distributed substantially homogeneously throughout the microgel. In some embodiments, the inorganic structures are distributed non-uniformly or asymmetrically within the microgel.

An embodiment of the invention comprises a two-dimensional or three-dimensional inorganic structure formed in situ within a microgel encapsulation. In certain aspects, the microgel encapsulation is formed by a microfluidic apparatus comprising a supply capillary, a collector capillary disposed within the supply capillary, the collector capillary having a tapered end with a small orifice which receives two or more fluids from within the supply capillary, and a source of radiation illuminating a region of the inner capillary. Further, an inner fluid is hydrodynamically focused into the collector capillary and breaks into droplets within the inner capillary, and the droplets move downstream and pass through the region illuminated by the source of radiation.

In some embodiments, a method for making the inventive microgel compositions comprises loading viruses, peptides, or biomineralizing molecules into a polymer network during the formation of pre-microgel droplets and substantially solidifying the droplets into microgels by exposure to radiation. In some embodiments, a method for making the inventive microgel compositions comprises loading microstructures or nanostructures into a polymer network during the formation of microgels and solidifying the microgels by exposure to optical radiation.

In various embodiments, viruses are encapsulated within a microgel during microgel formation. The viruses can provide a template for the synthesis of inorganic micro- or nanostructures. The structures can be synthesized within the microgel and can comprise particles, wires or tubes. In certain embodiments, the inorganic structures are nucleated and/or crystallized within the microgel. In some embodiments, the structures can be formed by biomineralization, e.g., the viruses provide a template to biomineralize the inorganic structures. In some embodiments, the micro- or nanostructures may nanowires, oxide nanowires, semiconductive nanowires, or catalytic nanowires. The microgel can be formed with a diameter of about any value between about 1 micron and about 200 microns. In various embodiments, the microgel can be formed in a microfluidic apparatus. In certain aspects the inorganic structure is formed within the microgel in a liquid environment.

A method for forming two-dimensional or three dimensional micro- or nanostructures within a microgel encapsulation comprises loading viruses into a polymer network during the formation of microgels, and solidifying the microgels by exposure to radiation. The method can further include diffusing inorganic precursor salts into the microgels and further subjecting the microgels to an incubating bath under conditions fostering nucleation and growth of crystals.

The foregoing and other aspects, embodiments, and features of the present teachings can be more fully understood from the following description in conjunction with the accompanying drawings.

BRIEF DESCRIPTION OF THE DRAWINGS

The skilled artisan will understand that the figures, described herein, are for illustration purposes only. It is to be understood that in some instances various aspects of the invention may be shown exaggerated or enlarged to facilitate an understanding of the invention. In the drawings, like reference characters generally refer to like features, functionally similar and/or structurally similar elements throughout the various figures. The drawings are not necessarily to scale, emphasis instead being placed upon illustrating the principles of the teachings. The drawings are not intended to limit the scope of the present teachings in any way.

The features and advantages of the present invention will become more apparent from the detailed description set forth below when taken in conjunction with the drawings.

DETAILED DESCRIPTION

In various embodiments, selected viruses or biomolecules are encapsulated in microgels and serve as a template for the synthesis of inorganic micro- or nanostructures. Encapsulation of viruses or biomolecules can occur during microgel formation, during which the viruses or biomolecules become distributed and retained within the microgel's polymeric matrix. In certain aspects, the microgel is solidified by exposure to radiation. The micogels encapsulating the viruses or biomolecules can be subjected to one or more nucleating baths under selected conditions, which fosters the nucleation and growth of inorganic micro- or nanostructures within the polymeric matrix. The inorganic structures can be two-dimensional or three-dimensional structures.

I. Microgel Encapsulation

Figure 1:
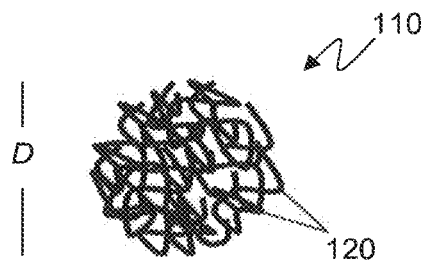
FIG. 1 represents a substantially spherical microgel 110 comprising a polymer matrix 120. The microgel has a diameter D.

Referring now to FIG. 1, a depiction of a substantially spherical microgel 110 is shown. The microgel 110 can comprise a polymeric matrix 120, substantially spherically shaped, having a diameter D. In various embodiments, the diameter D of the microgel is between about 1 micron (μm) and about 5 microns, between about 5 μm and about 10 microns, between about 10 μm and about 20 microns, between about 20 μm and about 50 microns, between about 50 μm and about 100 microns, between about 100 μm and about 200 microns, and in some embodiments between about 200 μm and about 500 microns. In some embodiments, a microgel comprises a polymeric gel particle comprising a chemically cross-linked three-dimensional polymeric network. In certain embodiments, the microgel 110 may not be substantially spherical in shape. For example, the microgel can be oblong, elliptical, disk or tear-drop shaped.

In yet additional embodiments, the microgel comprises a substantially spherical shell of thickness r. The substantially spherical shell can be substantially void at its center, or can be filled with a liquid. In various embodiments, the thickness t of the shell is a fraction, less than unity value, of the diameter D of the microgel. A method for forming a shell-like microgel is outlined in a publication to J-W Kim et al., "Fabrication of Monodisperse Gel Shells and Functional Microgels in Microfluidic Devices," *Angewandte Chemie Int. Ed.*, Vol. 46 (2007) pp. 1819-1822.

The microgel 110 material can be any of a number of polymers. In some embodiments, the microgel 110 can comprise poly(ethylene glycol) dimethacrylate. In some embodiments, the microgel 110 can comprise poly(N-isopropylacrylamide) (poyl(NIPAm)). In some embodiments, the microgel can comprise polyvinylalcohol. Alternatively or in addition, polymers that can be used to form the microgels include, but are not limited to, poly(ethylene glycol) diacrylate, poly (acrylamide), saponified polyacrylonitrile graft polymer, polyacrylic acid, polymethacrylic acid, poly(hydroxyalkyl methacrylate), alginate, hyaluronic acid, chitosan, dextran, gelatin, collagen, glucan, and their copolymers. In certain embodiments, combinations of one or more of the above polymers are used to form multistructure microgels, droplets within one or more shells.

Figure 2A:
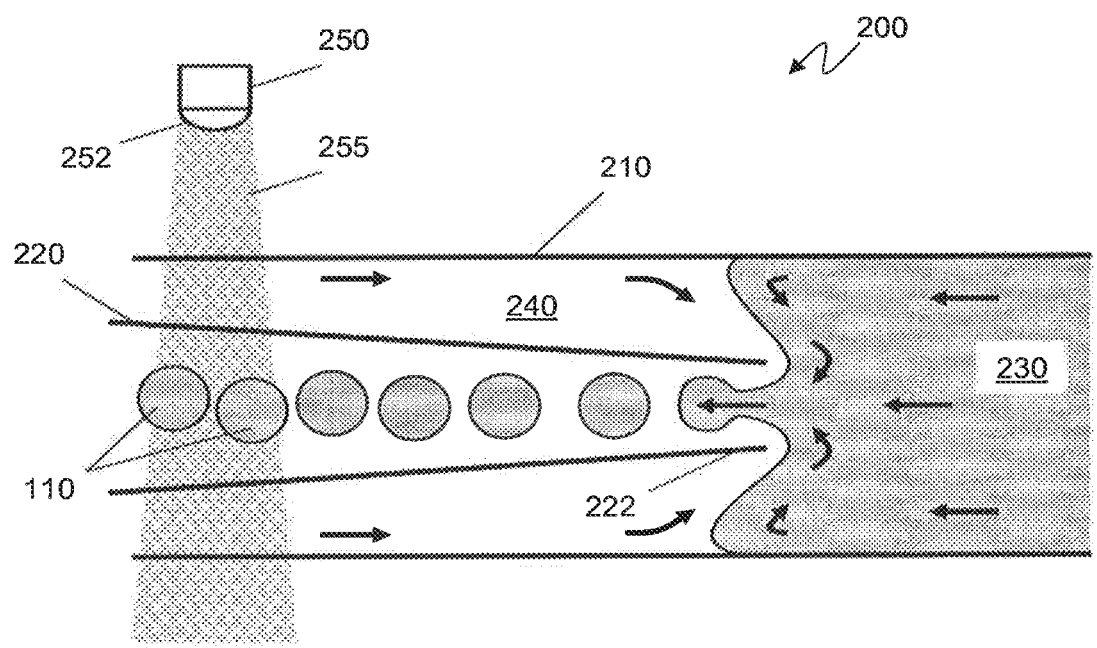
FIG. 2A depicts an embodiment of a microfluidic apparatus used to form microgels 110. Fluids 230 and 240 flow initially in opposite directions within capillaries 210 and 220 and are focused into a small orifice of a collector capillary. Hydrodynamic instability leads to the formation of substantially spherical microgels 110. An ultraviolet radiation source 250 illuminating at least a portion of the microgel stream can initiate solidification of the microgel droplets.

In various embodiments, plural microgel particles 110 are formed in a microfluidic apparatus as depicted in FIG. 2A. An apparatus 200 for forming microgel particles 110 can comprise an outer supply lumen or capillary 210 and an inner collector capillary 220, in some embodiments, the supply capillary 210 has a substantially square cross-sectional shape. In some embodiments, the supply capillary 210 has a substantially round cross-sectional shape. In certain embodiments, the supply capillary 210 has a substantially elliptical cross-sectional shape, The collector capillary 220 can have a substantially round, square or elliptical shape as well, in one embodiment, the outer supply capillary 210 has a substantially square cross-sectional shape and the inner collector capillary has a substantially round cross-sectional shape. In various embodiments, the inner collector capillary 220 is tapered along its length, as depicted in FIG. 2A.

The apparatus depicted in FIG. 2A indicates how microgel droplets can be formed by focusing fluid flow for fluids 230, 240 initially moving in opposite directions. The embodiments depicted in FIGS. 2B-2C indicate apparatuses in which pre-microgel droplets 205, 207 can be formed by fluids moving in a same direction FIG. 2B and by three flowing fluids 230, 235, 240 as in FIG. 2C. For the embodiment of FIG. 2C, multi-layered or multi-structured microgel droplets 207 can be formed. Aspects of such microgel formation apparatuses are described in the work of A. S. Utada, et "Dripping, Jetting, Drops, and Wetting: The. Magic of Microfluidics," *MRS Bulletin*, Vol. 32 (2007) pp. 702-708, the contents of which are incorporated herein by reference.

At least a portion of each the inner capillary 220 and outer capillary 210 can be fabricated from material transparent to radiation of a selected wavelength. In some embodiments, the entire capillary can be fabricated from transparent material. In certain embodiments, the capillaries 210, 220 are transparent to optical radiation and/or ultraviolet radiation. As an example, the capillaries can be transparent to radiation with wavelengths between about 900 nanometers (nm) and about 300 nm. In some embodiments, the capillaries are transparent to infrared radiation. As an example, the capillaries can be transparent to radiation with wavelengths between about 900 nanometers and about 10 microns. In some embodiments, one or both capillaries can be formed by heating and pulling glass capillary tubes. In some embodiments, the one or both capillaries can be formed inn part by microfabrication techniques, e.g., plasma etching of a substrate.

The microfluidic apparatus 200 can further include a source of radiation 250. This source can provide a beam of radiation 255 which illuminates microgel particles 110 moving along an interior portion of the apparatus and passing through the illuminating beam 255. In certain embodiments, the source of radiation 250 provides ultraviolet radiation at wavelengths between about 300 nm and about 450 nm. In certain embodiments, the source of radiation 250 provides optical radiation at wavelengths between about 450 nm and about 900 nm. In certain embodiments, the source of radiation 250 provides infrared radiation at wavelengths between about 900 nm and about 2000 nm. In various embodiments, the intensity of the provided radiation is alterable by attenuators placed in the beam path, by focusing elements placed in the beam path or by adjustments made to the power-supply of the source of radiation 250.

In some embodiments, the source of radiation 250 comprises a light-emitting diode (LED). In sonic embodiments, the source of radiation 250 comprises a laser diode, in sonic embodiments, the source of radiation comprises an arc lamp, a halogen lamp, a mercury lamp, or a high-intensity lamp.

In certain embodiments, a lens 252 or lens system is provided with the source of radiation 250. In some embodiments, the lens 252 or lens system (e.g., plural lens elements not depicted) is used to concentrate the provided radiation onto a selected region within the inner capillary 220. In some embodiments, the lens 252 or lens system is used to collimate, expand, or pre-shape the provided radiation and direct the collimated, expanded, or pm-shaped radiation to a selected region of the inner capillary 220. In certain embodiments, the capillaries provide cylindrical focusing of the radiation beam 255 and can comprise part of the lens system.

In one operational embodiment, two fluids are introduced into the outer supply capillary 210, as depicted in FIG. 2A. An outer fluid 240 can be introduced from one end of the supply capillary 210 and flow toward the small orifice 222 of the collector capillary 220. An inner fluid 230 can be introduced from the other end of the supply capillary 210 and flow toward the small orifice 222 of the collector capillary 220. In the vicinity of the small orifice 222, the outer fluid 240 can focus the inner fluid 230 as the two fluids are drawn through the orifice. This focusing and fluid motion results in the formation of a fluid thread downstream of the orifice 222 within the collector capillary 220. In various embodiments, the fluid thread breaks into droplets due to hydrodynamic instabilities. The droplets can then travel downstream and pass through an illumination region or beam 255 of optical radiation which can substantially solidify the droplets into microgel particles 110. The inner fluid 230 and outer fluid 240 can each be provided to the microfluidic apparatus by separate microfluidic pumping devices. In various embodiments, the apparatuses depicted in FIGS., 2A 2C and methods described produce a substantially monodisperse collection of substantially spherical microgel particles.

In various embodiments, the outer fluid 240 remains in liquid phase. The outer fluid can be an oil, e.g., white light mineral oil (e.g., light mineral oil 330779 available, from Sigma-Aldrich), or silicone oils (e.g., Fluka brands 85414, 85421, 10838 available from Sigma-Aldrich). Other oils which may be used include, but are not limited to, ester oils, corn oils, hydrocarbon oils (alkanes), fatty acids (e.g., oleic acid), fluorocarbon oil, etc. In various embodiments, the inner fluid 230 comprises an aqueous mixture of monomers, loading species, and a chemical agent. The monomers provide the basis material for forming the polymer matrix 120 of the microgel. The loading species constitutes the virus, biomolecule, material or structure desired to be loaded into the microgel. The chemical agent is included to initiate or assist in cross-linking the monomers and form a substantially solidified polymer matrix. In some embodiments, the chemical agent is a photoinitiator.

In certain embodiments, the inner fluid comprises an aqueous mixture of M13 bacteriophages, polyethylene glycol) dimethacrylate as a monomer, and 2-hydroxy-2-methyl-1-phenyl-1-propanone (Darocur 1173) as a photoinitiator. For such an inner fluid mixture, upon exposure to ultraviolet radiation the photoinitiator induces cross-linking of the monomers to substantially solidify the material. In certain embodiments, the concentration of photoinitiator in the mixture is between about 0.00000001% w/v and about 50% w/v. In more preferred embodiments, the concentration of photoinitiater is between about 1% w/v and about 5% w/v. In some embodiments, the pre-microgel droplets are exposed to ultraviolet radiation for a period between about 0.1 second and about 0.5 second, between about 0.5 second and about 1 second, between about 1 second and about 5 seconds, between about 5 seconds and about 10 seconds, between about 10 seconds and about 20 seconds, and yet in some embodiments between about 20 seconds and about 50 seconds, In certain embodiments, the exposure time of the pre-microgel droplets is selected to yield a desired polymeric mesh size within or hardness of the substantially solidified microgel.

Other viruses or biomolecules can be used in place of, or in addition to a selected virus such as the M13 virus. Alternatively or in addition, virus types which may be used for the inventive methods and compositions include, but are not limited to tobacco mosaic virus (TMV), cowpea mosaic virus, T7 bacteriophage, T4 bacteriophage, retrovirus, adenovirus, papillomavirus, parvovirus B19, herpes simplex virus, varicella-zoster virus, cytomegalovirus, epstein-barr virus, smallpox virus, vaccinia virus, hepatitis B virus, polyoma, virus, transfusion transmitted virus, enterovirus, corona virus, rhinovirus, hepatovirus, cardiovirus, aphthovirus, poliovirus, parechovirus, erbovirus, kobuvirus, teschovirus, coxsackie, reovirus, rotavirus, norwalk virus, hepatitis E virus, rubella virus, borna disease virus, dengue virus, hepatitis C virus, yellow fever virus, influenzavirus A, influenzavirus B, influenzavirus C, isavirus, thogotovirus, measles virus, mumps virus, respiratory syncytial virus, and their genetically engineered or altered versions. In various aspects, a portion of a selected virus is genetically altered such that the altered portion provides a specific binding affinity for a material of interest. In some embodiments, more than one type of virus may be encapsulated within a microgel and serve as a template for the synthesis of one or more types micro- nanostructures within the microgel.

M13 bacteriophage contains about 2700 copies of a major coat protein, pVIII protein, which are longitudinally assembled along the virus's DNA. The wild-type M13 virus coat includes about 2700 copies of major coat protein pVIII, which are stacked in units of five in a helical array. Moreover, several copies of minor coat proteins (pIII, pVI, pVII, and pIX proteins) are assembled at the two ends of the virus. This unique periodic, uniform structure is genetically controlled, and can be used to create tailor-made micro- or nanostructures. The various proteins may be genetically modified to have a specific peptide motif that can bind and organize nanomaterials. Because the amino acid sequence of this motif is genetically linked to the virus DNA and contained within the virus capsid, exact genetic copies of the virus scaffold can be created easily and quickly reproduced by infection into bacterial hosts. In one embodiment, the major coat protein of M13 bacteriophage is genetically engineered to specifically bind to metal ions or nanoparticles. Metal oxide nanotubes can be synthesized using this engineered virus template. Due to the anisotropic structure of bacteriophage, virus-based metal oxide nanotubes can self-assemble into a mesoporous nanocrystalline form. Furthermore, the highly oriented helical major coat proteins of M13 virus promote the structural stability of individual virus-based nanotubes, and can increase the durability of devices or components incorporating them. Additional aspects of virus-templated formation of micro- and nanostructures are described in U.S. patent application Ser. No. 11/254,540, the contents of which are incorporated herein by reference.

As used herein, the term "peptide" denotes a string of at least two amino acids linked together by peptide bonds. Peptide may refer to an individual peptide or a collection of peptides. Peptides may contain only natural amino acids, although non-natural amino acids (e.g., compounds that do not occur in nature but that can be incorporated into a polypeptide chain) and/or amino acid analogs as are known in the art may alternatively be employed. Also, one or more of the amino acids in a peptide may be modified, for example, by the addition of a chemical entity such as a carbohydrate group, a phosphate group, a farnesyl group, an isofamesyl group, a fatty acid group, a linker for conjugation, functionalization, or other modification, etc. In one embodiment, the modifications of the peptide lead to a more stable peptide (e.g., greater half-life in vivo). These modifications may include cyclization of the peptide, the incorporation of D-amino acids, etc, None of the modifications should substantially interfere with the desired activity of the peptide.

Figure 3A:
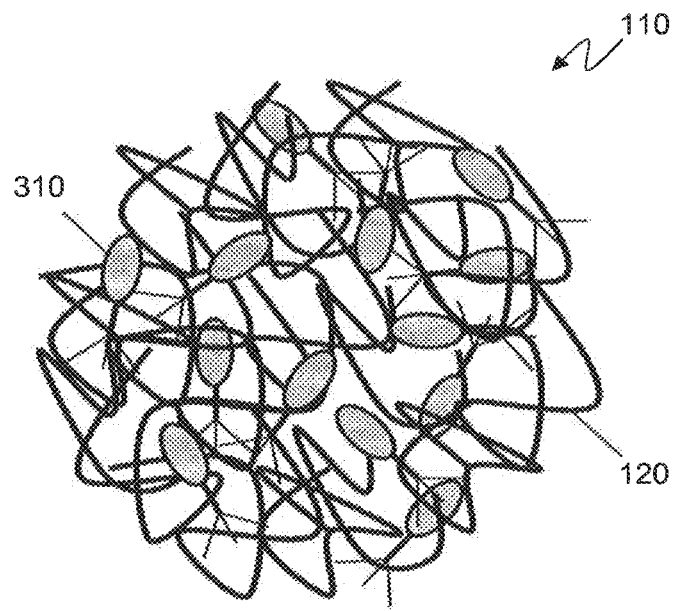
FIG. 3A is an enlarged illustration of a microgel encapsulating viruses 310.

Referring again to FIG. 2A, a loading species present in the inner fluid, e.g., present in suspension in the inner fluid, can become encapsulated in the microgel as the tnicrogel forms and is substantially solidified. An enlarged view of a microgel particle 110 with encapsulated viruses 310 is depicted in FIG. 3A. In various embodiments, the loading species becomes retained in and dispersed throughout the polymer matrix 120 of the microgel. In some embodiments, the loading species remains stably lodged within the microgel. In some embodiments, the loading species is mobile within the polymer matrix 120 of the microgel.

In certain embodiments, the mobility of the loading species can be controllably altered, As an example, the mesh size of the polymer matrix 120 can be controllably affected by adjusting the concentration of cross-linking agent in the pre-microgel liquid mixture, and/or the exposure time of the pre-microgel droplets to ultraviolet radiation. A higher concentration of cross-linking agent can reduce the average mesh size or porosity of the matrix, whereas a lower concentration can increase the porosity of the microgel matrix. In some embodiments, a concentration of cross-linking agent is chosen such that the loading species or the subsequently synthesized micro- or nanostructures have a desired mobility within the formed microgel.

In some embodiments, the size of the formed microgel particles can be controllably altered. In various aspects, the size of the microgels can be altered by controlling the flow rates and/or viscosities of the inner 230 and/or outer 240 fluids. Additionally, selection of the diameter of the small orifice 222 can alter microgel size. Also, control of surfactant concentration can alter microgel size.

II. Nucleation of Structures Within Microgels

In various embodiments, viruses or biomolecules encapsulated in a microgel can provide templates for the synthesis of inorganic micro- or nanostructures. In certain embodiments, the viruses or biomolecules promote nucleation and crystalization of inorganic structures within the microgel. In certain embodiments, the viruses or biomolecules promote biomineralization within the microgel, The structures can be micro- or nanostructures formed in two-dimensional or three-dimensional geometeries within the microgel's polymeric matrix. In certain embodiments, the polymer matrix can guide the formation of the structures.

Figure 3B:
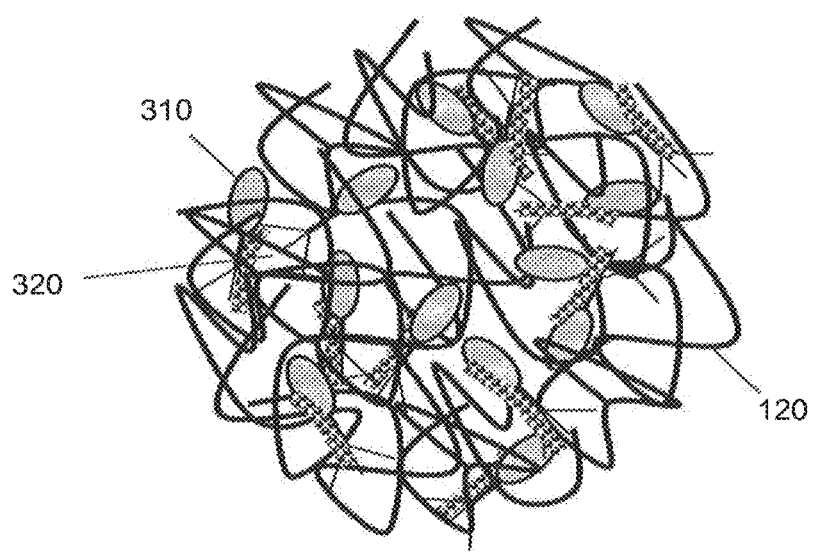
FIG. 3B depicts synthesis of inorganic structures 320 initiated by the encapsulated viruses 310.

Once loaded with a virus or biomolecule 310, as depicted in FIG. 3A, the microgels 110 can be subjected to a nucleating and growth process. Under appropriate conditions, this process fosters the nucleation and growth of inorganic micro- or nanostructures 320 within the microgel's polymer matrix 120, as indicated in FIG. 3B.

In certain embodiments, the loaded virus, expressing either one type or two types of modified peptides, may be used to nucleate nanoparticles of a metal oxide. Micro- or nanoparticles and/or nanotubules may be produced at room temperature, in contrast to the elevated temperatures (>150° C.) required for some prior art techniques. In one embodiment, the pVIII-engineered M13 virus is incubated with a metal salt precursor, for example, cobalt chloride, at a concentration between about 1 mM and about 5 mM. Metal ions in solution are chelated by the carboxylic acid ligands. Chelated metal ions are then oxidized by adding a basic solution such as sodium hydroxide (NaOH), at, for example, between about 10 mM and about 100 mM., Alternatively, metallic nanoparticles may be nucleated and grown on the virus major coat proteins by adding between about 5 mM and about 10 mM of a reducing agent such as sodium borohydride (NaBH$_4$) or hydrazine (N$_2$H$_2$) to a metal salt solution in which the microgels are suspended. In some embodiments, the virus can be fully coated with nanoparticles, forming a metallic nanotube. Because the metallic materials in nanostructures are very reactive, the metallic nanotube is easily oxidized in an aqueous solution or in air to produce a nanotube composed of crystalline metal oxide nanoparticles. In another embodiment, the virus scaffold may be removed from the nanotubes, for example, using enzymes or solvents that disrupt or lyse the viral proteins without disturbing the ceramic phase.

The production conditions may be altered to modify the synthesized nanostructure. In certain embodiments, the size of the nanoparticles varies roughly with temperature. Smaller particles may be produced by decreasing the temperature while larger particles may be produced by increasing temperature. The viral system is stable from about 4° C. to about 80° C.; other templates, e.g., peptides, nucleic acids, etc., will be stable in different temperature ranges. Particles may range in diameter from about 2 nm across to about a micron across, for example, between 2 nm and 100 nm, between 100 nm and 500 nm, or between 500 nm and 1000 nm.

In another embodiment, alternative metal oxides, such as $Mn_2O_4$ or $V_2O_5$, may formed into micro- or nanostructures using the techniques described above. Other metals that may be used to produce micro- nanoparticles, or nanotuhes according to embodiments of the invention include transition metals, for example, nickel, iron, cadmium, tungsten, chromium, zirconium, titanium, scandium, yttrium, copper, etc. In some embodiments, non-transition metal oxides may be formed into micro- or nanostructures. Exemplary metals that may be exploited for use with the invention include but are not limited to calcium, aluminum, barium, beryllium, magnesium, and strontium. All of these may be produced using the same engineered viruses, or biopanning may be employed to identify peptides that are even more selective for the particular metal or metal oxide. Alternatively or in addition, mixed metal oxides may be produced by incubating engineered phage in solutions including salts of more than one metal.

In some embodiments, the microgels are first immersed in an aqueous solution which includes a precursor salt. The precursor salt in solution can diffuse into the microgel and interact with the viruses within the microgel. In various aspects, at least a portion of the virus exhibits a specific binding affinity for the material or chemical ion of interest. In solution, a metal or metal ion can coordinate to a peptide integrated with or expressed in a virus. In certain embodiments, the peptide functions as a chelating agent. The interaction between the material and the peptide can be any one or combination of the following interaction mechanisms: electrostatic, van der Waals, hydrophobic, and hydrogen bonding. In certain embodiments, the microgels are immersed in a precursor salt solution for a period of time between about 30 minutes and about 60 minutes, between about 60 minutes and about 120 minutes, between about 2 hours and about 4 hours, and yet in some embodiments between about 4 hours and about 8 hours. The temperature of the solution can be maintained between about 15° C. and about 25° C., or in some embodiments between about 25° C. and about 35° C. In some embodiments, the solution can be stirred during immersion of the microgels. Magnetic stirring may be used to agitate the solution with a stirring rate of any value between about 50 RPM and about 500 RPM.

The microgel particles can then be removed from the precursor salt solution, e.g., by filtering or centrifugation. In some embodiments, the solution with microgels is centrifuged between about 200 RPM and about 500 RPM, between about 500 RPM and about 1,500 RPM, and yet in some embodiments between about 1,500 RPM and about 3,000 RPM.

The microgels can then be re-dispersed and incubated in a nucleation and growth solution, in some embodiments, the concentration of the incubation solution during crystalization is between about 1 mM and about 2 mM, between about 2 mM and about 4 mM, and yet in some embodiments between about 4 mM and about 8 mM. While in this solution, inorganic structures can nucleate and grow within the microgel. The extent of inorganic structure formation can be controlled by a variety of factors, e.g., concentrations of solutions, times in solutions, temperature, agitation conditions, polymer mesh size, etc. After nucleation and growth, the microgels can then be removed from the nucleation solution and rinsed with water to terminate structure growth and to clean the microgels for further use.

Figure 2B:
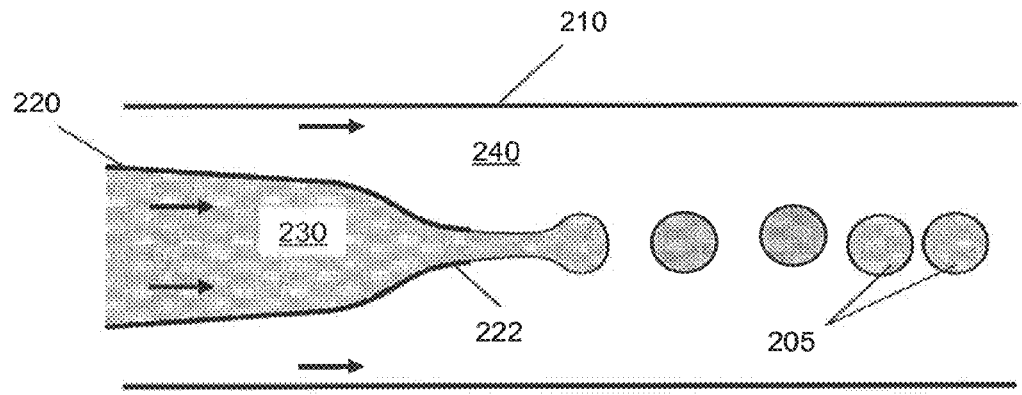
FIGS. 2B-2C depict additional embodiments of microfluidic apparatus used to form microgels.
Figure 2C:
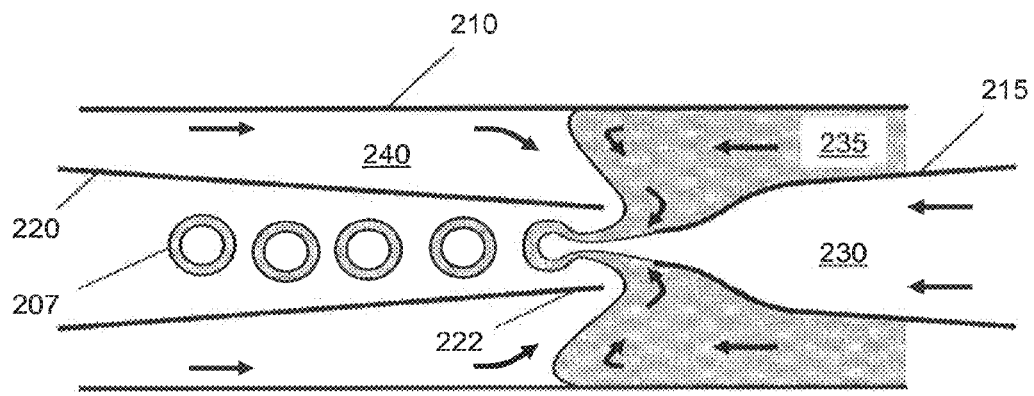

In some embodiments, the micro- or nanostructures can be synthesized in solution, dispersed in a pre-microgel solution, and encapsulated into microgels directly with the apparatus depicted in FIGS. 2A-2C. In such embodiments, the micro- or nanoparticles or nanotuhes may exhibit short-or long-range order in the formed microgels, for example, as a liquid crystal phase, depending on the concentration of phage in the original solution. In some embodiments, between about $10^{14}$ phage/mL to about $10^{14}$ phage/microliter solutions are employed. The degree of order increases with concentration. M13 bacteriophage exhibits long-range order in liquid crystalline phases due to its unique anisotropic and monodisperse characteristics. Depending on the solvent, the virus concentration, the ionic strength of the solution and, for cobalt oxide and other magnetic materials, the applied external magnetic field, various liquid crystalline phases such as smectic, cholesteric and nematic phases can be achieved. Lower concentrations result in a nematic phase, while progressively higher concentrations result in cholesteic and smectic phases. When the concentration of the virus-based micro- or nanoparticles or nanotuhes in the solution is lower than the critical concentration to form the nematic phase, the particles may not form a liquid crystal phase in the microgels. The particular liquid crystalline phase of a micro- or nanoparticle nanotube solution will affect the mesoporosity, mesostructure and the mechanical properties of microgels formed from the solution.

It will be appreciated that multi-structured microgels encapsulating more than one type of synthesized micro- or nanoparticle or nanotube can be created following the methods described above and, for example, using the apparatus depicted in FIG. 2C.

In various embodiments, the formed and encapsulated structures 320 remain within the microgel. In some embodiments, the formed structures 320 are substantially immobile within the microgel, in sonic embodiments, the structures 320 are chemically stabile within the microgel.

Figure 4:
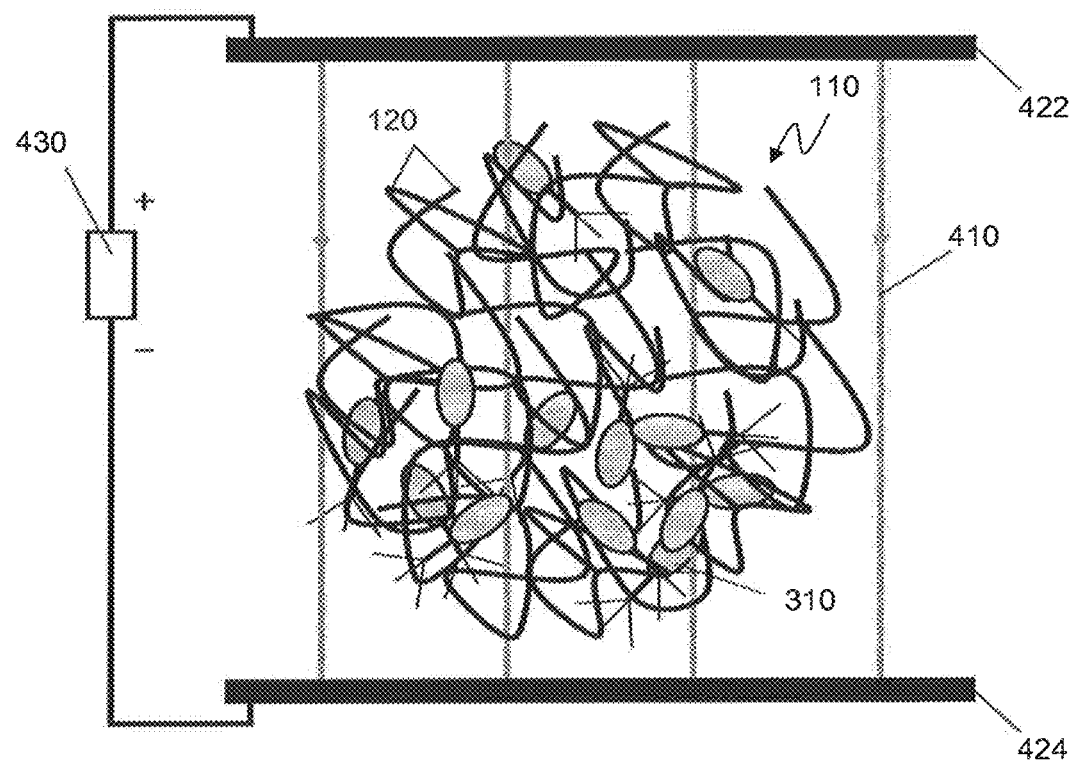
FIG. 4 depicts electrophoresis of viruses 310 within a microgel to produce an asymmetric or non-uniform distribution of the encapsulated viruses.

In certain embodiments, micro- or nanostructures 320 formed within the microgels can be distributed asymmetrically within the microgel. There are at least two approaches to producing asymmetrically-distributed structures within a microgel, In some embodiments, viruses encapsulated within a formed microgel can be redistributed using electrophoresis. The illustration of FIG. 4 depicts electorphoretically redistributed viruses 310 within the microgel. In an embodiment employing electrophoresis, one or more microgels are subjected to an electric field 410 which can induce movement or migration of the encapsulated viruses 310 or micro- or nanostructures 320 within the microgel. The resulting migration can produce non-uniform or asymmetric distribution of the encapsulated viruses or structures. For embodiments wherein the viruses are redistributed, inorganic micro- or nanostructures can be formed via nucleation and growth as described above after the redistribution of viruses. The resulting synthesized structures will, in various embodiments, be asymmetrically distributed within the microgel. The electric field 410 for electrophoresis can be created by a pair of electrodes 422, 424 and a voltage source 430, The electrodes can be much larger than the microgel or collection of microgels.

III. Applications

Microgel-encapsulated inorganic structure compositions produced by the inventive methods can be used in a variety of different applications. In some embodiments, the compositions can be used for batteries, supercapacitors, fuel cells, and solar cells. In some embodiments, the compositions can be used in photo-oxidation reactors and display devices.

In certain embodiments, the inventive compositions can be used in the manufacture of batteries, supercapacitors, or fuel cells. An advantageous aspect of the composition is a protective polymer network encapsulating the inorganic structures. In one application, the polymer network can act as a protective layer for the inorganic material when used in a battery. Li-ion batteries often employ a graphite anode, a liquid or polymer electrolyte, and a cathode that can accumulate lithium ions, such as a transition metal oxide, e.g., cobalt oxide, vanadium oxide, or nickel oxide. In prior art batteries, the lithium ions intercalate themselves between oxide layers. Metal oxide microgels produced according to various embodiments described herein may also accumulate lithium ions through intercalation. In various embodiments, the mobility of the nanoparticles within the microgels and mobility of the microgels themselves allow the microgels to accumulate and discharge lithium ions without cracking. Without being limited by any particular hypothesis, it is also thought that the lithium ions are additionally accumulated by the microgel composition via deposition of lithium oxide on the surfaces of the micro- or nanoparticles or nanotubes through standard electrochemical mechanisms, e.g., through the oxidation of lithium and the reduction of cobalt or other oxidized metals in the microgels. In some embodiments, the high surface area, of the virus-based nanotubes within the microgel provides additional reaction sites for lithium ions as they intercalate through and between the nanotubes, thereby potentially increasing the capacity of an electrode comprising the inventive microgel compositions.

One skilled in the art will also recognize that microgels according to an embodiment of the invention may also be employed in the anode of Li-ion batteries. The composition of the particular metal oxide may be selected with reference to the electrochemical potential of the material used at the cathode, whether it is another virus-based microgel composition or some other material. In general, the materials for the anode and cathode of the battery are selected such that, when the battery is discharging, the oxidation of lithium at the anode and its reduction at the cathode is energetically favored, while the reverse reactions are energetically favored during recharging. Any of the transition metal and non-transition metal oxides described above may be used to form microgels for use on the anode side of a lithium ion battery. Some exemplary materials include cobalt, nickel, chromium, and manganese. Of course, the anode and cathode materials may be optimized with respect to one another to achieve a desired difference in redox potential between the two sides of the cell.

Electrodes in certain lithium secondary batteries can often fail because of their direct chemical interaction with organic solvents used for dissolution of lithium ion salts. In certain embodiments, the inventive compositions include a cross-linked ion-conducting polymer which can provide a chemically robust barrier to prevent the electrode material from being exposed to the organic solvent directly. In some embodiments, an electrode, e.g., a cathode or anode, can be formed from a collection of ion-conducting polymeric microgels encapsulating inorganic nanowires, In some embodiments and retelling to FIG. 3B, an ion-conducting, polymeric matrix 120 can provide a sufficient protective layer for the inorganic structures 320 formed within the microgel. In sonic embodiments, an outer protective ion-conducting shell can be added to the micogel using techniques described by J-W Kim, et al., "Fabrication of Monodisperse Gel Shells and Functional Microgels in Microfluidic Devices," *Angewandte Chemie Int. Ed.*, Vol. 46 (2007) pp. 1819-1822.

Figure 5A:
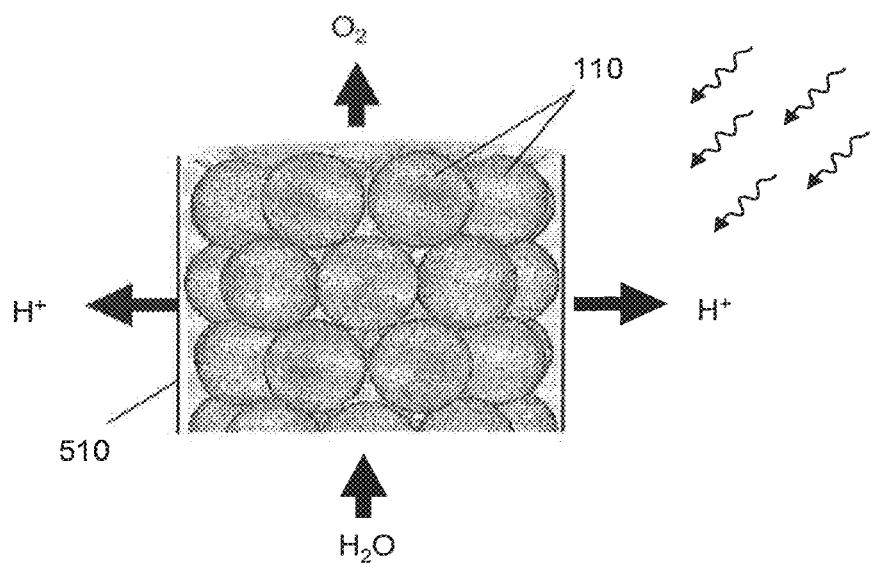
FIG. 5A is a pan view illustration of a reactor bed comprising an ordered array of the inventive microgels 110.

In some embodiments, the inventive compositions can provide multi-scaled frameworks for the generation of energy from sunlight. As an example and referring to FIG. 5A, water can be split to create oxygen and hydrogen utilizing photoactive chemicals, materials or structures such as porphyrins or quantum dots to absorb light and certain materials that catalyze the splitting of water, such as ruthenium oxide or iridium oxide. In certain embodiments, photoactive chemicals, materials, or structures and catalyzing materials are co-encapsulated in microgels. The microgels can then be exposed to water and sunlight to produce hydrogen and oxygen. In some embodiments, a proton selective membrane 510 may surround a collection of microgels. In some embodiments, photoactive materials are formed as micro- or nanostructures within a microgel according to the inventive methods described above. In some embodiments, catalyzing materials are formed as micro- or nanostructures according to the inventive methods described above. In some embodiments, either the photoactive material or the catalyzing material is encapsulated directly in the microgel during microgel formation. In certain embodiments, the porosity of the microgel is designed and selected to control the flow of water into the microgel exhausting of produced gas from the microgel. In various embodiments, the co-encapsulation of photoactive and catalyzing materials within a microgel provides long-term stability to the composite. In certain embodiments, the composite microgels can be disposed in ordered structures which can improve device efficiency, e.g., a reactor tube comprising an ordered array of microgels as depicted in FIG. 5A.

In some embodiments, microgels encapsulating asymmetric distributions of inorganic structures can be used for electronic display devices or microelectrodes. As an example, an asymmetric distribution of viruses within a microgel can provide two distinctive regions within the composition. One region can function as an electrode, and the other region can function as an electrolyte layer. In certain embodiments, a microgel encapsulating an asymmetric distribution of inorganic structures comprises an electrode and electrolyte layer for a micron-scale electronic device.

Figure 5B:
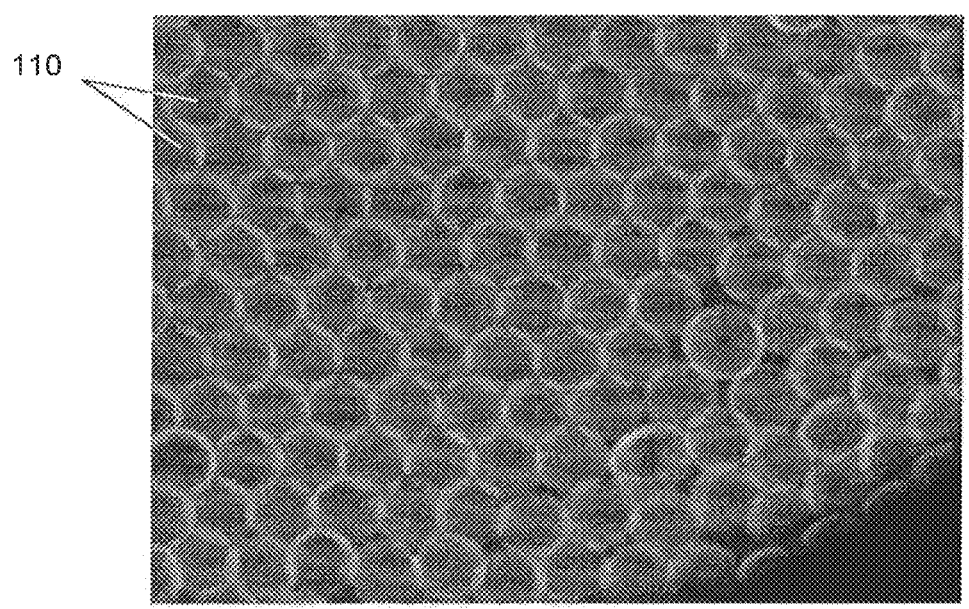
FIG. 5B is a micrograph showing an ordered colloidal crystal array of the inventive microgels 110.

In certain embodiments, the inventive microgel compositions can be ordered into two-dimensional or three-dimensional colloidal crystal arrays. An example of polyethylene glycol) (PEG) microgels encapsulating titanium oxide ($TiO_2$) nanowires ordered into a two-dimensional array is shown in FIG. 5B. Various methods may be used to order the microgels into a two-dimensional or three-dimensional array. In some embodiments, the microgels may be introduced in fluid solution into or onto a smooth surface or containment volume. As fluid is removed by evaporation or run-off, the system can be subjected to mild vibration. The mild vibration can induce tight packing of microgels into a two or three-dimensional array. In some embodiments, the microgels can be introduced in a dry environment into or onto a smooth surface of containment volume. As the microgels are introduced, the system can be subjected to mild vibration. The mild vibration can induce tight packing of the microgels into a two- or three-dimensional array. Such forces as viscous drag forces from air or liquid, gravitational force, or centrifugal force can also be utilized to induce microgel packing and array formation. The microgel arrays may be formed on substrates or in containment volumes formed from glass, polymer, silicon, silicon wafer, indium tin oxide, thin insulating films, thin conductive films, thin semi-conducting films, organic thin films, metallic films, etc.

In various embodiments, large-scale colloidal crystal arrays comprising the inventive microgel compositions are incorporated into electronic devices, biotechnological devices, optical devices, or biosensors. In certain embodiments, large-scale colloidal crystal arrays comprising the inventive microgel compositions are incorporated into electronic displays which provide images and/or information to a human subject.

EXAMPLES

Example 1

Encapsulation of Viruses in Microgel Spheroids

Figure 6A:
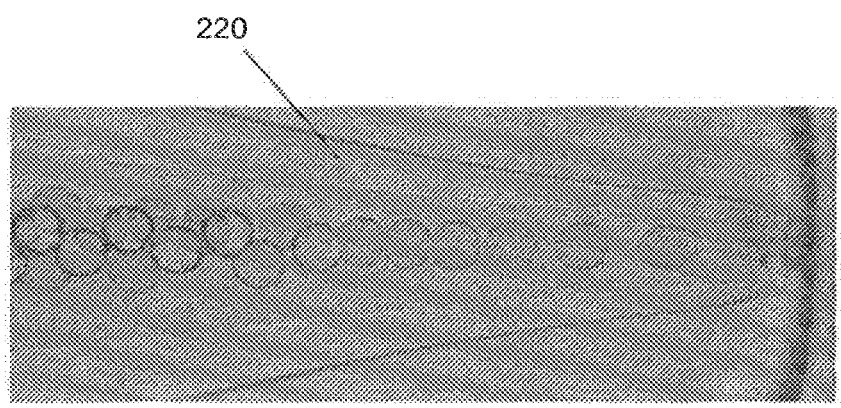
FIG. 6A is a micrograph showing the formation of pre-microgel droplets within a microfluidic capillary 220.

Referring to FIG. 2A, an experiment was carried out with the microfluidic apparatus to demonstrate formation of and encapsulation of M13 bacteriophages in substantially spherically shaped monodisperse microgels having diameters of about 50 microns. The apparatus comprised a tapered internal collector capillary 220 and a square external supply capillary 210. In the region near the small orifice of the internal capillary, an outer fluid 240 focused an inner fluid 230 through the orifice to form a fluid thread that would periodically break into droplets as a result of hydrodynamic instabilities. A micrograph of droplet formation observed during one experimental trial is shown in FIG. 6A.

White light mineral oil was used as the continuous phase liquid for the outer fluid 240. The inner fluid 230 was an aqueous mixture of M13 bacteriophages, poly(ethylene glycol) dimethacrylate as the monomer, and 2-hydroxy-2-methyl-1-phenyl-1-propanone (Darocur 1173) as the photoinitiator. The concentration of photoinitiator was about 2.5% w/v. After pre-microgel droplets were formed, a crosslinking reaction was achieved by exposing the pre-microgel droplets to ultraviolet light. The pre-microgel droplets travelel downstream in the inner capillary and passed through a region illumination by ultraviolet light. The exposure duration was about 7 seconds.

Figure 6B:
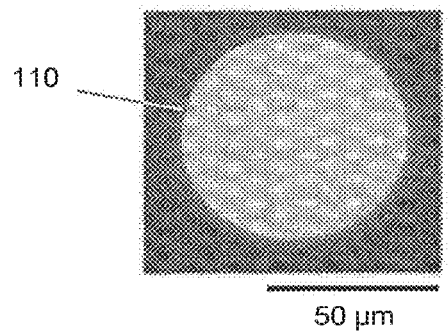
FIG. 6B is a micrograph showing uniformity of fluorescent radiation within a single spherical microgel. The radiation is emitted from fluorescently-labeled viruses encapsulated within the microgel.

In one experiment, the encapsulated viruses were labeled with fluorescein isothiocyanate (FITC), a fluorescent marker. A microscope image shown in FIG. 6B indicates homogenous distribution of the encapsulated viruses within the microgel. The fluorescent radiation from the labeled viruses is distributed substantially homogenously throughout the microgel.

Example 2

In Situ Synthesis of Cobalt Oxide Nanowires

Figure 7A:
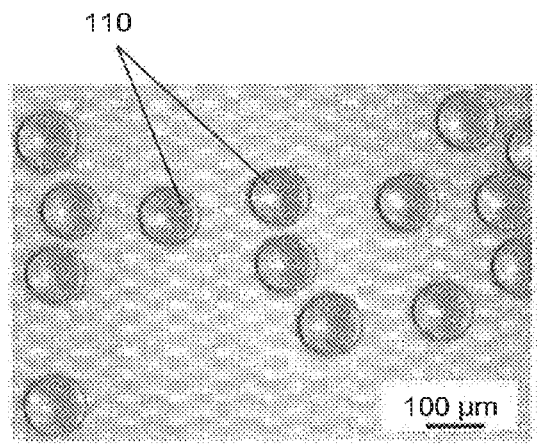
FIG. 7A is a micrograph showing microgel spheroids encapsulating viruses.

An experiment was carried out to demonstrate nucleation and growth of inorganic nanowires within substantially spherical microgel particles approximately 100 microns in diameter. For this experiment, E4 bacteriophages were expressed on M13 viruses incorporated in poly(ethylene glycol) dimethacrylate microgels during their formation as described in Example 1. The loaded microgels were then immersed for about 80 minutes in a solution of aqueous cobalt chloride ($CoCl_2$). The concentration of the cobalt chloride was about 1 mM in water. The solution was stirred using mild magnetic stirring at about 100 revolutions per minute and maintained at about room temperature, 20° C. During immersion, precursor molecules diffuse into the polymer matrix of the microgel particles. Some of the microgel spheres were removed and examined under an optical microscope after exposure to the precursor salt, An image of the microgels is shown in FIG. 7A. The microgels are about 100 microns in diameter and light colored.

Figure 7B:
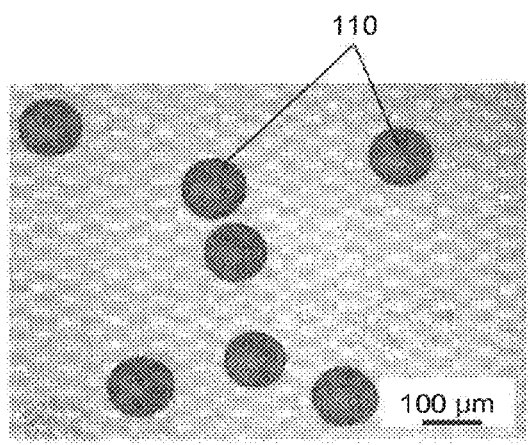
FIG. 7B is a micrograph of microgels after in situ synthesis of $Co_3O_4$ nanowires on virus templates within the microgels.

The microgels were then removed from the precursor salt solution The microgels were collected using centrifugation at about 1,000 RPM for about two minutes. The supernatant was decanted, and the microgels were then dispersed and incubated in a $NaBH_4$ solution. The concentration of this solution was about 5 mM $NaBH_4$. During incubation, cobalt oxide ($Co_3O_4$) nanowires formed within the polymer matrix. After incubation, the microgels were collected by centrifugation. Some of the microgel spheres were removed and examined under an optical microscope after nucleation and growth of inorganic structures. An image of the microgels after incubation in $NaBH_4$ solution is shown in FIG. 7B. The microgels are substantially uniformly dark colored indicating the presence of inorganic structures distributed substantially homogeneously within the microgels.

Figure 7C:
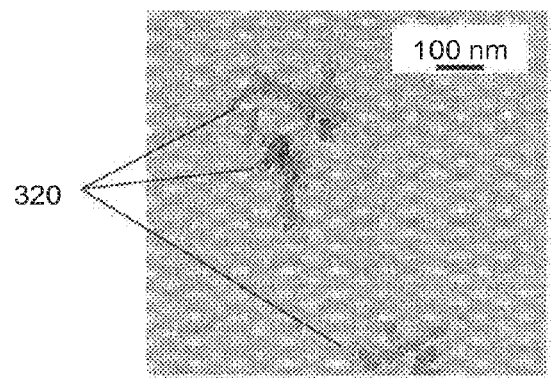
FIG. 7C is a transmission electron micrograph of $Co_3O_4$ nanowires extracted from microgel spheroids.

Some of the microgels were lyophilized after synthesis of the inorganic structures and physically disrupted to extract nanowires. The extracted nanowires were observed using a JEOL 200CX transmission electron microscope (TEM). The extracted nanowires were dispersed on a carbon-coated copper grid, washed with deionized water, and then dried in air. A TEM image of the extracted $Co_3O_4$ nanowires is shown in FIG. 7. The results show that inorganic nanostructures can be formed in situ within polymeric microgels.

All literature and similar material cited in this application, including, but not limited to, patents, patent applications, articles, books, treatises, and web pages, regardless of the format of such literature and similar materials, are expressly incorporated by reference in their entirety. In the event that one or more of the incorporated literature and similar materials differs from or contradicts this application, including but not limited to defined terms, term usage, described techniques, or the like, this application controls.

The section headings used herein are for organizational purposes only and are not to be construed as limiting the subject matter described in any way.

While the present teachings have been described in conjunction with various embodiments and examples, it is not intended that the present teachings be limited to such embodiments or examples. On the contrary, the present teachings encompass various alternatives, modifications, and equivalents, as will be appreciated by those of skill in the art.

The claims should not be read as limited to the described order or elements unless stated to that effect. It should be understood that various changes in form and detail may be made by one of ordinary skill in the art without departing from the spirit and scope of the appended claims. All embodiments that come within the spirit and scope of the following claims and equivalents thereto are claimed.

What is claimed is:

1. A method comprising loading microstructures or nanostructures into a polymer network during the formation of pre-microgel droplets and substantially solidifying the droplets into microgels by exposure to radiation, wherein the microstructures or nanostructures include viruses, peptides, or biomineralizing molecules that provide a template for nucleation and growth of inorganic structures.

2. A method comprising:
    loading microstructures or nanostructures into a polymer network during the formation of pre-microgel droplets;
    substantially solidifying the droplets into microgels by exposure to radiation;
    diffusing inorganic precursor salts into the microgels; and
    incubating the microgels in a solution fostering nucleation and growth of inorganic structures.

3. The method of claim 1 wherein the radiation is optical radiation.

* * * * *